(12) United States Patent
Wu

(10) Patent No.: US 7,975,368 B2
(45) Date of Patent: Jul. 12, 2011

(54) WIRELESS RECEIVER STRUCTURE

(75) Inventor: Cheng-Cheng Wu, Sindian (TW)

(73) Assignee: Dexin Corporation, Taipei Hsien (TW)

( * ) Notice: Subject to any disclaimer, the term of this patent is extended or adjusted under 35 U.S.C. 154(b) by 668 days.

(21) Appl. No.: 12/068,134

(22) Filed: Feb. 4, 2008

(65) Prior Publication Data

US 2009/0193646 A1  Aug. 6, 2009

(51) Int. Cl.
*B23P 19/00* (2006.01)
*H01R 43/00* (2006.01)
*H05K 13/04* (2006.01)

(52) U.S. Cl. ............. 29/729; 29/428; 29/594; 29/609.1; 312/237; 340/5.64; 343/906

(58) Field of Classification Search ............. 29/428, 29/592.1, 594, 595, 609.1; 312/237; 340/5.64; 343/906; 345/163
See application file for complete search history.

(56) References Cited

U.S. PATENT DOCUMENTS 7,548,211 B2 * 6/2009 Platz .............................. 343/718
2004/0067737 A1 * 4/2004 Kuo .............................. 455/90.3
* cited by examiner

*Primary Examiner* — Paul D Kim
(74) *Attorney, Agent, or Firm* — Rosenberg, Klein & Lee

(57) ABSTRACT

A structure of wireless receiver includes a metallic casing, a positioning base, a receiving module, and a housing. The metallic casing has a circumferential wall defining an accommodating space therein, and two opposite ends thereof formed with an insertion hole and a through hole in communication with the accommodating space. The positioning base has a mounting trough, and is disposed in the accommodating space of the metallic casing. The positioning base has two side ends being fixed to the circumferential wall. The mounting trough is in communication with the accommodating space and the through hole. The receiving module is disposed in the mounting trough of the positioning base via the through hole of the metallic casing. The housing is assembled to the through hole of the metallic casing, and the through hole is sealed by the housing to block the receiving module.

10 Claims, 5 Drawing Sheets providing a metallic casing having an accommodating space with both opposite ends thereof having an insertion hole and a through hole in communication with the accommodating space forming a positioning base having a mounting trough by joining to the accommodating space of the metallic casing via an injection molding process, two side ends of the positioning base being fixed to an inner circumferential wall forming the accommodati providing a receiving module, assembling the receiving module in the accommodating space of the metallic casing, the receiving module being fixed by inserting it into the mounting trough of the positioning base via the through hole of the metallic casin providing a housing, assembling the housing into the through hole of the metallic casing, the housing sealing the through hole to block the receiving module from sliding out of the through hole

FIG. 1

WIRELESS RECEIVER STRUCTURE

BACKGROUND OF THE INVENTION

1. Field of the Invention

The present invention is related to a method for manufacturing a wireless receiver and a structure of the same, and in particular to a method for manufacturing a wireless receiver and a structure of the same, which can be applied to receive the signals of wireless peripheral devices of a computer.

2. Description of Related Art

With the advancement of technologies, modern people have more demands for a comfortable operation of an electronic device. Therefore, many peripheral devices of a computer have been designed into wireless devices, such as a wireless mouse, wireless keyboard, wireless remote control, wireless game operating lever or the like. The wireless transmission can be achieved by means of radio frequency (RF) or Bluetooth. A wireless receiver is inserted into a USB port of the computer so as to receive the signals transmitted by the wireless peripheral device. In this way, the wireless transmission and control between the computer and the wireless peripheral device can be achieved, so that those who work with a computer will not be restricted by the cable transmission, but can operate the wireless peripheral device more freely.

The current wireless receiver used in the computer is constituted of a USB connector having a USB interface, a signal receiving module joined to the rear of the USB connector and electrically connected thereto, and a casing positioned in the rear of the USB connector to cover the signal receiving module. Via this arrangement, the USB connector of the wireless receiver is inserted into the USB port of the computer directly, thereby receiving the signals.

However, in terms of practical designs, since the lengthwise size of the USB connector is of a standard size, if the lengthwise sizes of the signal receiving module and the casing are added, the whole size of the wireless receiver will be at least once to twice the standard size of the USB connector, while the whole length thereof will exceed 4 cm. As a result, for some wireless peripheral devices having an accommodating space therein for accommodating the wireless receiver, the wireless receiver of a larger length will occupy more space. Especially the wireless mouse, if a wireless receiver of a larger length is used, it is more difficult for the manufacturer to make such a wireless mouse because the arrangement of elements within the wireless mouse is not easy, which may increase the cost and obstruct the miniaturization.

Consequently, because of the above technical defects, the inventor keeps on carving unflaggingly through wholehearted experience and research to develop the present invention, which can effectively improve the defects described above.

SUMMARY OF THE INVENTION

The object of the present invention is to provide a method for manufacturing a wireless receiver and a structure of the same, which has a reduced lengthwise size and can be assembled and manufactured easily.

For achieving the object described above, the present invention provides a method for manufacturing a wireless receiver, including the steps of:

(1) providing a metallic casing having an accommodating space with both opposite ends thereof having an insertion hole and a through hole in communication with the accommodating space;

(2) forming a positioning base having a mounting trough by joining to the accommodating space of the metallic casing via an injection molding process, two side ends of the positioning base being fixed to an inner circumferential wall forming the accommodating space, the mounting trough being in communication with the accommodating space and through hole;

(3) providing a receiving module, assembling the receiving module in the accommodating space of the metallic casing, the receiving module being fixed by inserting it into the mounting trough of the positioning base via the through hole of the metallic casing; and (4) providing a housing, assembling the housing to the through hole of the metallic casing, the housing sealing the through hole to block the receiving module from sliding out of the through hole, thereby forming a wireless receiver product.

For achieving the object described above, the present invention provides a structure of a wireless receiver manufactured by the method for manufacturing a wireless receiver, which includes: a metallic casing having an accommodating space with an insertion hole and a through hole on both opposite ends thereof in communication with the accommodating space; a positioning base having a mounting trough, the positioning base being provided in the accommodating space of the metallic casing, the positioning base having two side ends being fixed to an inner circumferential wall forming the accommodating space, the mounting trough being in communication with the accommodating space and the through hole; a receiving module provided in the mounting trough of the positioning base via the through hole of the metallic casing; and a housing assembled to the through hole of the metallic casing, the housing sealing the through hole to block the receiving module.

The present invention has advantageous effects as follows. The positioning base is fixed in the metallic casing via the injection molding process, and the receiving module is assembled in the positioning base. Then, the housing is assembled on the metallic casing, thereby blocking the receiving module from sliding out of the through hole of the metallic casing. The manufacturing process of the whole structure is simple without causing difficulty in assembling or manufacturing. Further, most of the receiving module is hidden in the metallic casing, which reduces the whole length directly. In comparison with the conventional art, the whole length of the present invention occupies less space within the wireless peripheral device of a computer.

In order to further understand the characteristics and technical contents of the present invention, a detailed description is made with reference to the accompanying drawings. However, it should be understood that the drawings are illustrative only but not used to limit the present invention thereto.

BRIEF DESCRIPTION OF THE DRAWINGS

FIG. 1 is a flow chart showing the procedure of the present invention;

DETAILED DESCRIPTION OF THE PREFERRED EMBODIMENTS

Figure 2:
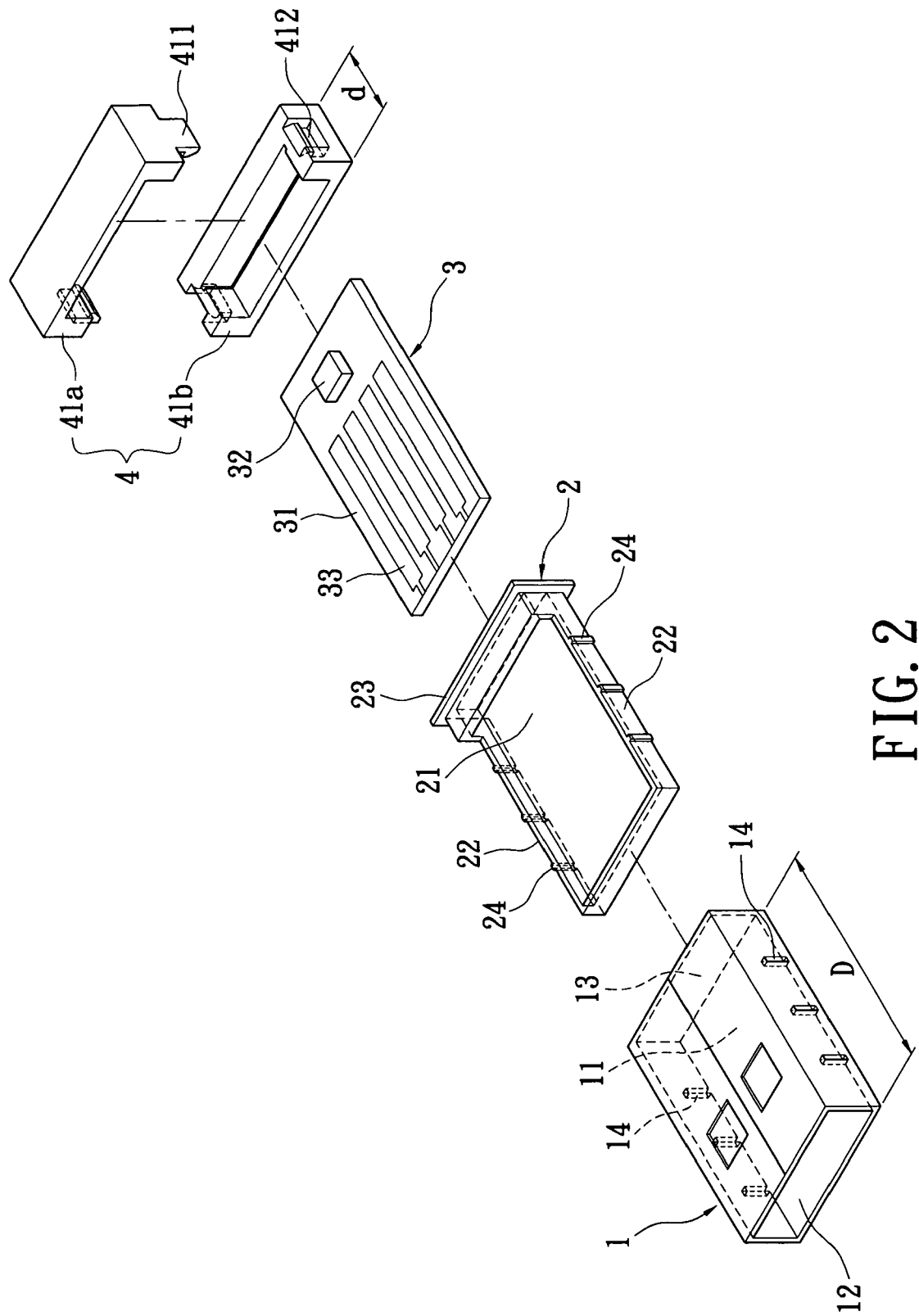
FIG. 2 is an exploded perspective view of the present invention.
Figure 3:
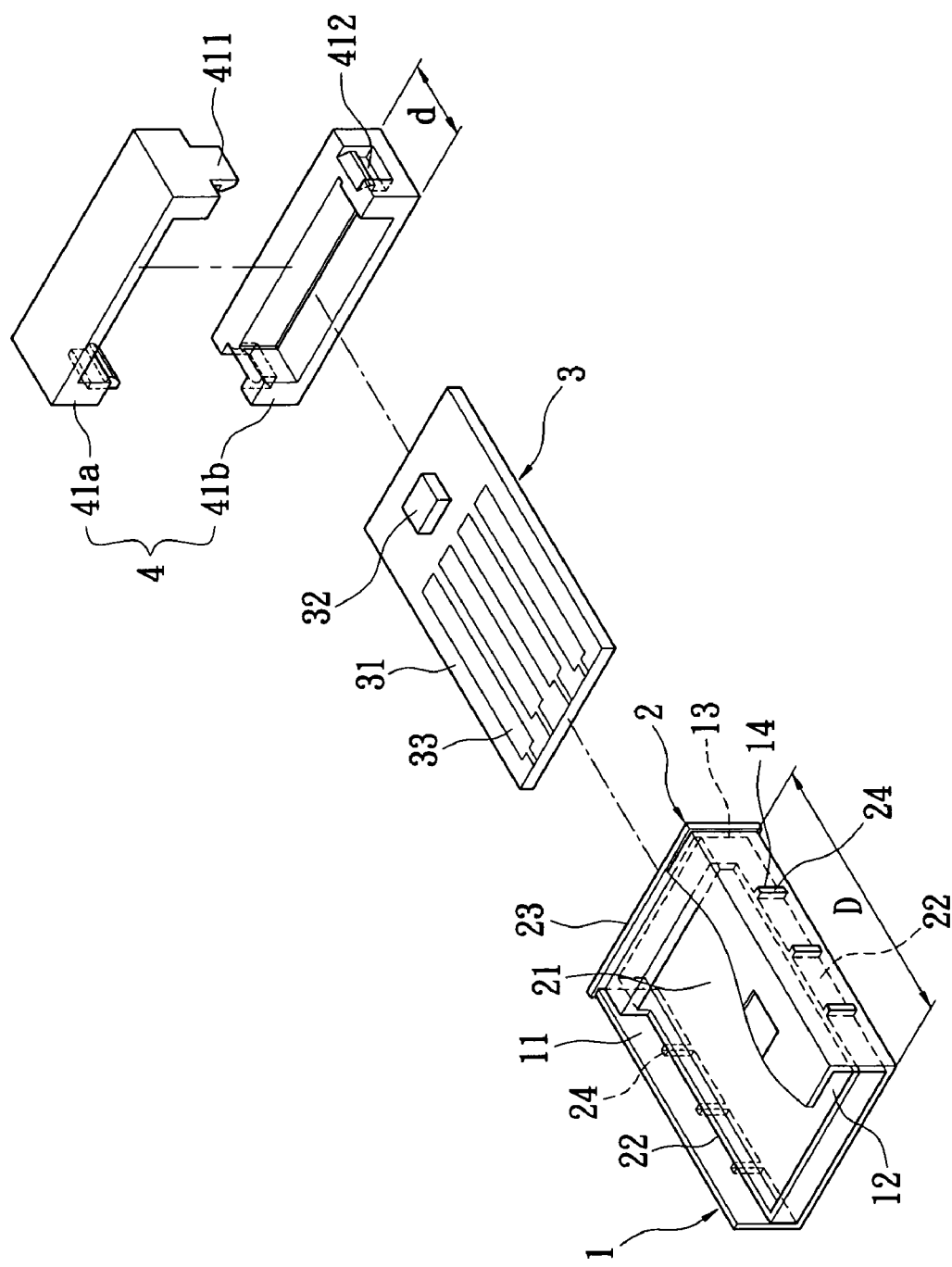
FIG. 3 is an assembled perspective view showing a portion of the present invention, in which the positioning base is fixed in the metallic casing with an upper portion of the metallic casing is removed.
Figure 4:
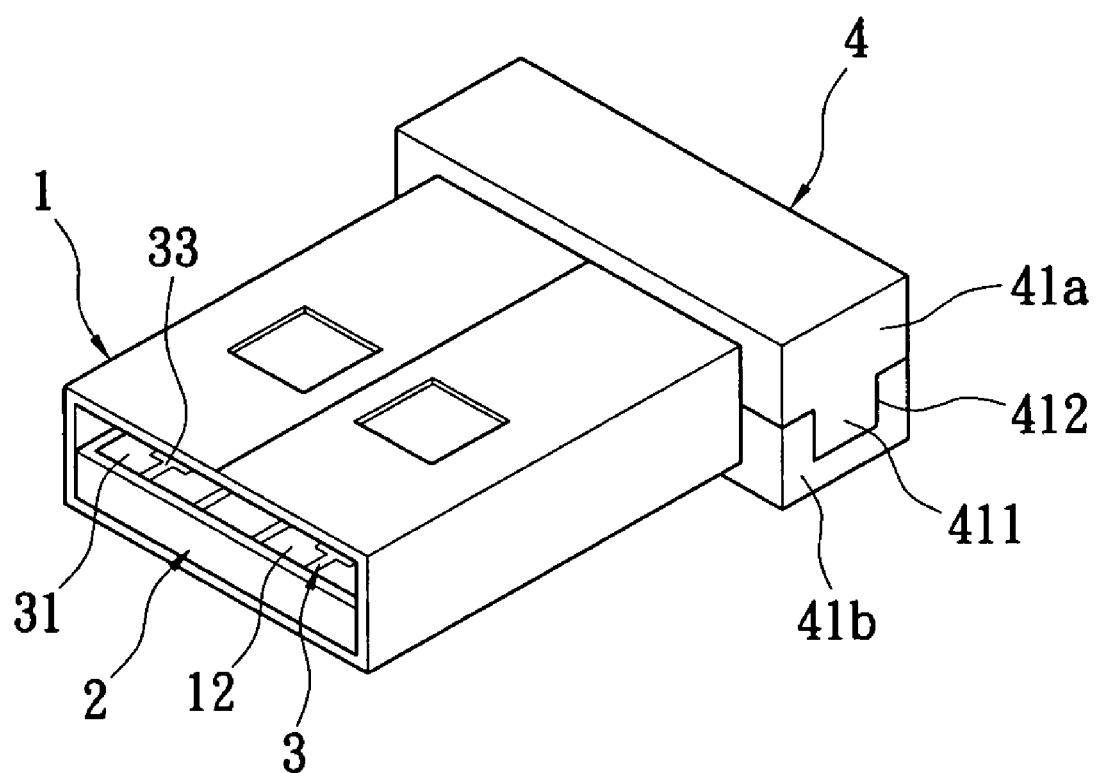
FIG. 4 is an assembled perspective view of the present invention.

Please refer to FIGS. 1 to 4. The present invention provides a method for manufacturing a wireless receiver and a structure of the same. The method for manufacturing a wireless receiver includes the steps of:

(1) First, a metallic casing 1 is provided. The metallic casing has a circumferential wall defining a front opening (as shown by the insertion hole 12 of FIG. 2), a rear opening (as shown by the through hole 13), and an accommodating space 11 enclosed therebetween. Specifically, the front opening and the rear opening, i.e. the insertion hole 12 and the through hole 13 are in direct communication with the accommodating space 11.

The metallic casing 1 can be formed by means of pressing and bending a metallic substrate, thereby forming the accommodating space 11, the insertion hole 12 and the through hole 13. Further, it is worthy to mention that the lengthwise size D of the metallic casing 1 corresponds to the size of a USB port of a computer. Also, the metallic casing 1 can be formed with penetrating fixing holes 14.

(2) Next, a positioning base 2 having a mounting trough 21 is formed via an injection molding process to fix to the accommodating space 11 of the metallic casing 1. After formation, both side ends 22 of the positioning base 2 are fixed to an inner circumferential wall forming the accommodating space 11, and the mounting trough 21 is in communication with the accommodating space 11, the insertion hole 12 and the through hole 13.

After the positioning base 2 is formed by the injection molding process, it can be further formed with a protruding portion 23 extending outside the through hole 13 of the metallic casing 1. Since the process for forming the positioning base 2 from the metallic casing 1 via a plastic injection molding process is a well-known prior art, the description thereof is omitted herein.

Further, after the positioning base 2 is formed by the injection molding process, it can be formed with engaging portions 24 to be engaged in the fixing holes 14 of the metallic casing 1, thereby enhancing the connecting strength between the positioning base 2 and the metallic casing 1.

(3) A receiving module 3 is provided and assembled in the accommodating space 11 of the metallic casing 1. The receiving module 3 is fixed by inserting it into the mounting trough 21 of the positioning base 2 via the through hole 13 of the metallic casing 1.

The receiving module 3 has a circuit board 31, a receiving element 32 provided above or beneath the circuit board 31, and conductive contacting portions 33 provided on the circuit board 31. In the present embodiment, a plurality of conductive contacting portions 33 is provided on the circuit board 31 respectively. The conductive contacting portion 33 can be conductive terminals or golden fingers. The receiving element 32 can be a Bluetooth chip or a RF chip.

Further, after the receiving module 3 is inserted into the positioning base 2, the surface of the conductive contacting portion 33 is exposed in the accommodating space 11 of the metallic casing 1 to correspond to the insertion hole 12.

(4) A housing 4 is provided and assembled to the through hole 13 of the metallic casing 1, so that the housing 4 seals the through hole 13 to block the receiving module 3 from sliding out of the through hole, thereby forming a wireless receiver product.

The above-mentioned housing 4 can be engaged with the protruding portion 23 of the positioning base 2. The housing 4 comprises two shelves 41a, 41b connected to each other. In this way, the two shelves can be joined to the through hole 13 of the metallic casing 1 and are engaged with the protruding portion 23 of the positioning base 2.

Further, the housing 4 has a lengthwise size d, which is preferably smaller than or identical to the lengthwise size D of the metallic casing 1.

Figure 5:
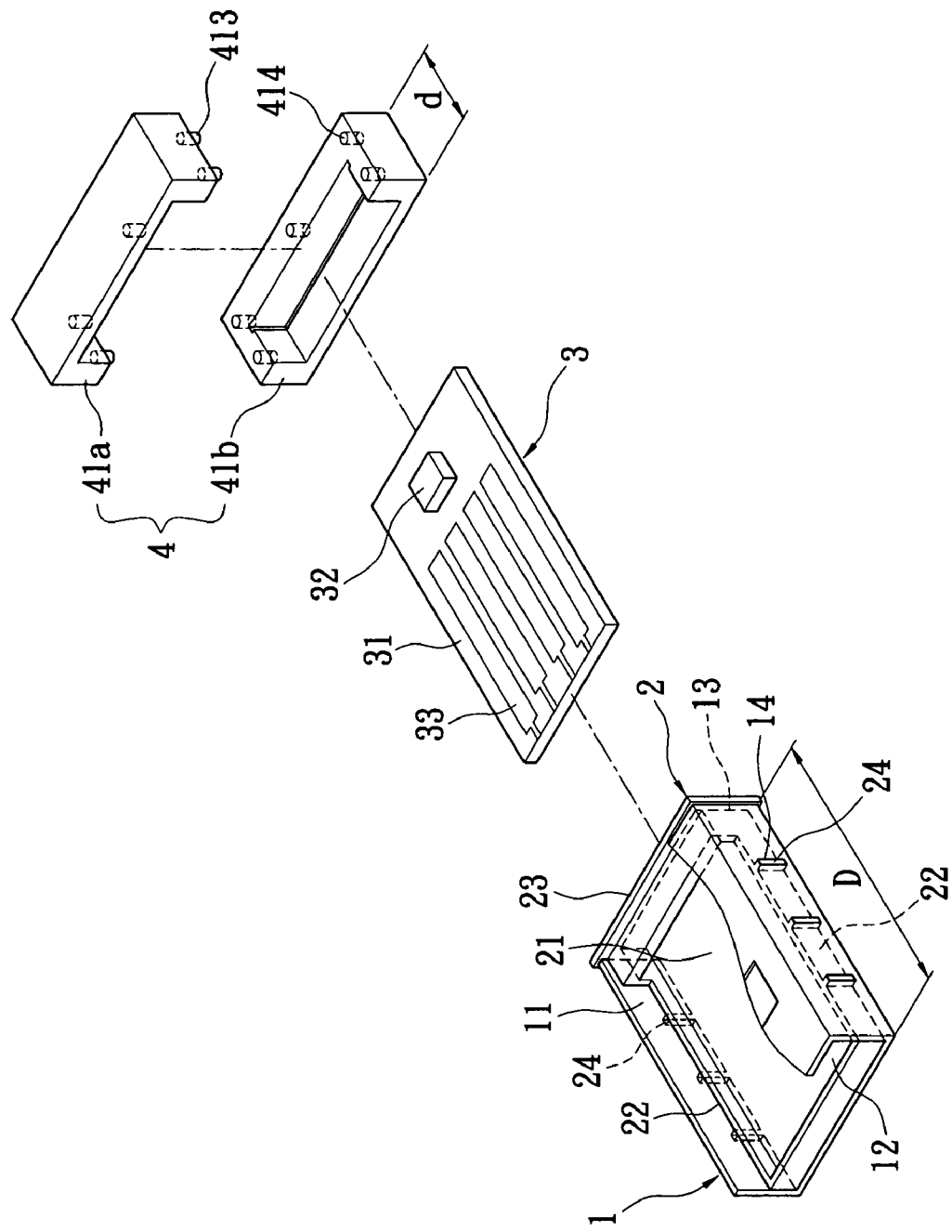
FIG. 5 is an assembled perspective view showing another portion of the present invention.

Moreover, the shelves 41a, 41b of the housing 4 can be engaged with each other. That is to say, engaging hooks 411 and engaging grooves 41 that are engaged with each other can be provided as shown in FIG. 2. Alternatively, engaging tenons 413 and engaging holes 414 are arranged in such a manner that the engaging tenons 413 are engaged in the engaging holes 414, as shown in FIG. 5, thereby fixing with each other. In the present invention, the form of engagement is not limited to any specific ones. Further, the two shelves 41a, 41b can be connected to each other in a vertical or left-to-right direction.

Thus, with the above method, the structure of a wireless receiver of the present invention can be manufactured. The structure of the wireless receiver includes the metallic casing 1, the positioning base 2, the receiving module 3 and the housing 4. Since the relationship of the connection among these parts has been described previously, the description related thereto will be omitted to avoid redundancy.

When the above structure is in use, the insertion hole 12 of the metallic casing 1 is aligned with the USB port of the computer and then is inserted therein. As a result, the conductive contacting portions 33 of the receiving module 3 can be brought into contact with and electrically connected to the corresponding conductive contacting portions within the USB port, thereby transmitting the signals between the receiving element 32 of the receiving module 3 and the computer. In this way, the wireless receiver can receive the signals transmitted by the wireless peripheral device of the computer, so that the wireless transmission and control between the computer and the wireless peripheral device can be achieved.

To sum up the above, the positioning base 2 is fixed in the metallic casing 1 via the injection molding process, and the receiving module 3 is assembled in the positioning base 2. Then, the housing 4 is assembled on the metallic casing 1, thereby blocking the receiving module 3 from sliding out of the through hole 13 of the metallic casing 1. The manufacturing process of the whole structure is simple without causing difficulty in assembling or manufacturing. Further, most of the receiving module 3 is hidden in the metallic casing 1, which reduces the total length of the structure directly. In comparison with the conventional art, the whole length of the present invention is about 1.5 to 3 cm, and thus occupies less space within the wireless peripheral device of a computer, especially the wireless mouse. Next, preferably, the lengthwise size d of the housing 4 is smaller than or identical to the lengthwise size D of the metallic casing 1, and is about 1.5 to 2 cm, thereby further reducing the size.

Further, it is worthy to mention that the receiving module 3 is inserted into the positioning base 2 of the metallic casing 1. If the receiving module 3 is damaged accidentally during the manufacturing process or in use, in the present invention, the user can merely disassemble the housing 4 to take out the damaged receiving module 3 and then perform an exchanging action. Thus, it is not necessary to take out the receiving module 3 by breaking the housing. More specifically, when the signal receiving module of the conventional wireless receiver is damaged, it is usually unable to be exchanged because breaking the housing may also break the whole structure. Thus, the whole structure should be thrown away, which makes the repair impossible and wastes the resource. Therefore, the present invention can be disassembled and repaired easily.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure of wireless receiver, comprising:
a metallic casing having a circumferential wall defining an accommodating space, and two opposite ends thereof formed with a front opening and a rear opening in communication with the accommodating space;
a positioning base having a mounting trough, the positioning base being provided in the accommodating space of the metallic casing, the positioning base having two side ends being fixed to the circumferential wall, the mounting trough being in communication with the accommodating space and the rear opening, wherein the positioning base has a protruding portion extending outside the rear opening of the metallic casing;
a receiving module provided in the mounting trough of the positioning base via the rear opening of the metallic casing; and
a housing assembled to the rear opening of the metallic casing, the housing sealing the rear opening to block the receiving module, wherein the housing is fixed to the protruding portion.

2. The structure of wireless receiver according to claim 1, wherein the receiving module has conductive contacting portions, a surface of the conductive contacting portion is exposed in the accommodating space to correspond to the front opening.

3. The structure of wireless receiver according to claim 2, wherein the receiving module has a circuit board and receiving elements disposed on the circuit board, the conductive contacting portions are provided on the circuit board.

4. The structure of wireless receiver according to claim 1, wherein the housing comprises two shelves connected to each other, thereby joining the housing to the rear opening of the metallic casing.

5. The structure of wireless receiver according to claim 1, wherein a lengthwise size of the housing is smaller than or identical to a lengthwise size of the metallic casing.

6. A structure of wireless receiver, comprising:
a metallic casing having a circumferential wall defining an accommodating space, and two opposite ends thereof formed with a front opening and a rear opening in communication with the accommodating space;
a positioning base having a mounting trough, the positioning base being provided in the accommodating space of the metallic casing, the positioning base having two side ends being fixed to the circumferential wall, the mounting trough being in communication with the accommodating space and the rear opening;
a receiving module provided in the mounting trough of the positioning base via the rear opening of the metallic casing; and
a housing assembled to the rear opening of the metallic casing, the housing sealing the rear opening to block the receiving module;
wherein the housing has two shelves connected to each other, thereby joining the housing to the rear opening of the metallic casing.

7. The structure of wireless receiver according to claim 6, wherein the positioning base has a protruding portion extending outside the rear opening of the metallic casing, the housing is fixed to the protruding portion.

8. The structure of wireless receiver according to claim 6, wherein the receiving module has conductive contacting portions, a surface of the conductive contacting portion is exposed in the accommodating space to correspond to the front opening.

9. The structure of wireless receiver according to claim 8, wherein the receiving module has a circuit board and receiving elements disposed on the circuit board, wherein the conductive contacting portions are provided on the circuit board.

10. The structure of wireless receiver according to claim 6, wherein a lengthwise size of the housing is smaller than or identical to a lengthwise size of the metallic casing.

* * * * *